(No Model.)
S. G. NORTH.
GEARING FOR ICE CREAM FREEZERS.
No. 548,083. Patented Oct. 15, 1895.
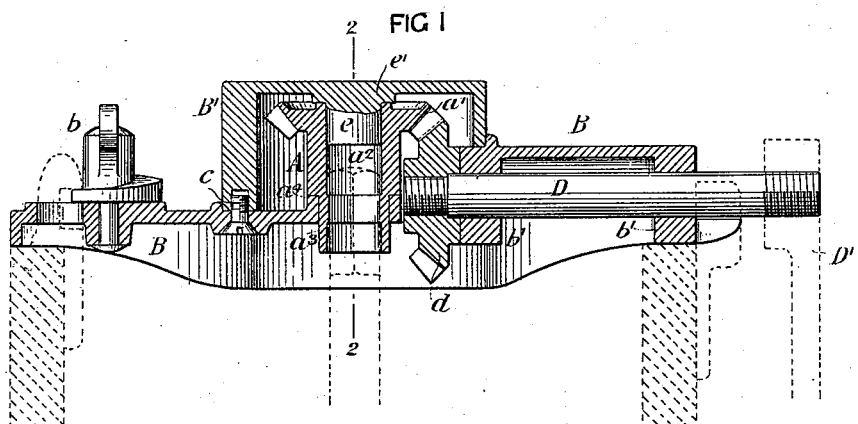
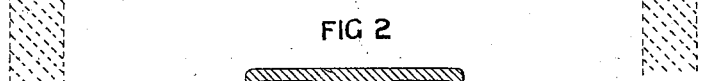
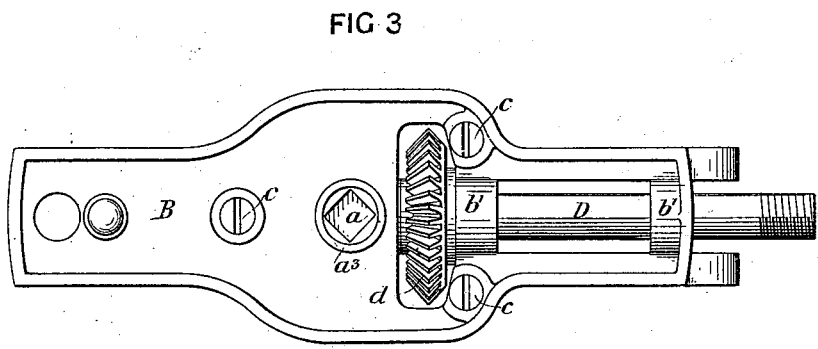
WITNESSES
INVENTOR
Selden G. North
By his Attorneys

UNITED STATES PATENT OFFICE.

SELDEN G. NORTH, OF PHILADELPHIA, PENNSYLVANIA, ASSIGNOR TO THE NORTH BROTHERS MANUFACTURING COMPANY, OF SAME PLACE.

GEARING FOR ICE-CREAM FREEZERS.

SPECIFICATION forming part of Letters Patent No. 548,083, dated October 15, 1895.

Application filed May 12, 1894. Serial No. 511,009. (No model.)

*To all whom it may concern:*

Be it known that I, SELDEN G. NORTH, a citizen of the United States, residing in Philadelphia, Pennsylvania, have invented certain Improvements in Ice-Cream Freezers, of which the following is a specification.

The object of my invention is to provide a simple and rigid bearing for the driving-gear of ice-cream freezers. This object I attain in the following manner, reference being had to the accompanying drawings, in which—

Figure 1 is a longitudinal sectional view of the head of an ice-cream freezer. Fig. 2 is a transverse sectional view on the line 2 2, Fig. 1. Fig. 3 is an inverted plan view.

I have shown the tub paddle shaft and crank of the ice-cream freezer in dotted lines in Fig. 1. The paddle-shaft has a squared end adapted to the squared portion $a$ of the hub A. This hub A passes through the cross-plate B, which extends from one side of the tub to the other, and is secured thereto by the latch $b$.

Cast integral with the hub A is a gear-wheel $a'$. This gear-wheel meshes with a wheel $d$, screwed onto a shaft D, adapted to bearings $b'$ in the cross-plate B. To the end of this shaft is secured the crank D' shown by dotted lines in Fig. 1.

B' is a cap adapted to inclose the gearing, being secured to the cross-plate by screws $c$, three in the present instance. Depending from the cap is a bearing-stud $e$, adapted to fit the orifice $a^2$ in the hub A, and a shoulder $e'$ is formed at the base, so that while the plate B and the stud $e$ support the hub A against lateral motion it is prevented from moving vertically by the shoulder $e'$ and the plate. The portion $a^3$, which passes through the plate, is reduced in diameter to form a shoulder $a^4$, which rests upon the plate. Thus it will be seen that the hub of the gear-wheel is mounted rigidly in the head, and yet it can turn freely, as it is supported at top and bottom against lateral motion, and is confined against vertical displacement.

I claim as my invention—

1. The combination in an ice cream freezer, of the crank shaft, its gear, the vertically arranged hub with which the paddle shaft engages, the gear wheel on said hub meshing with the gear wheel on the crank shaft, a cross plate on which the hub rests, a cap secured to the cross plate, and having a depending stud projecting into the hub and forming the upper bearing for the same, substantially as described.

2. The combination of the cross plate of an ice cream freezer, the driving shaft, mounted therein, a gear wheel on said shaft, a vertically arranged hub having a reduced portion passing through the plate, the enlarged portion resting upon the plate a gear wheel formed on the hub, and gearing with the wheel on the driving shaft, a cap detachably secured to the cross plate and having a depending stud extending into the hub and forming the upper bearing therefor, said cap confining the hub to the plate, substantially as described.

In testimony whereof I have signed my name to this specification in the presence of two subscribing witnesses.

SELDEN G. NORTH.

Witnesses:
WILL A. BARR,
JOSEPH H. KLEIN.